United States Patent Office 3,640,909
Patented Feb. 8, 1972

3,640,909
SUBSTITUTED ACYLATED POLYIMINE RESINS
Giffin D. Jones, Midland, and Harold H. Roth, Bay City, Mich., assignors to The Dow Chemical Company, Midland, Mich.
No Drawing. Filed Feb. 17, 1969, Ser. No. 799,987
Int. Cl. C08g 33/08
U.S. Cl. 260—2 BP
9 Claims

ABSTRACT OF THE DISCLOSURE

High molecular weight branched polyimine resins useful in paper manufacture are made by partially deacylating a linear N-acylated ethylenimine polymer by acid hydrolysis and reacting the product with a polyfunctional crosslinking agent such as an epihalohydrin or a diepoxide. Preferably, the acylated polymer is produced by polymerizing a 2-substituted oxazoline in the presence of a cationic catalyst.

BACKGROUND OF THE INVENTION

The present invention relates to water-soluble, cationic resins of high molecular weight which are lightly crosslinked and to a process for making them. It relates particularly to modified homopolymers of oxazolines which have valuable properties as flocculants and additives in the manufacture of paper.

High molecular weight polyethylenimine is useful as a flocculating agent and as an additive in papermaking promotes filler retention in the finished product. Such conventional polymers are highly branched and those of sufficiently high molecular weight to form aqueous solutions of the desired viscosity commonly contain a significant proportion of insoluble gelled material. Such polymers have the added disadvantage in paper manufacture of causing loss of brightness or yellowing of the finished paper. Such yellowing can be reduced by acylation of the polyimine structure by reaction with an alkanoic acid anhydride or acid chloride, but this treatment causes such a marked loss in flocculation activity that the acylated resin has severely reduced utility for this application.

It is known that substituted oxazolines having the formula

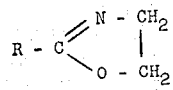

where R is a hydrocarbon or substituted hydrocarbon radical or similar substituent form homopolymers by ring opening in the presence of a cationic polymerization catalyst at about 0–200° C. Such catalysts include strong mineral acids, organic sulfonic acids and their esters, acidic salts such as ammonium sulfate, AlCl₃, SnCl₄, BF₃, and organic diazonium fluoroborates, dialkyl sulfates, and salts of such strongly acidic materials with the oxazoline. The reaction has been described in detail by Tomalia et al., J. Polymer Science 4, 2253 (1966), Bassiri et al. Polymer Letters 5, 871 (1967), and by Seeliger, German Patent 1,206,585. The polymer thereby obtained is a linear N-acylated polyethylenimine having a molecular structure consisting essentially of repeating units having the formula

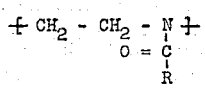

These polymers are useful for making films, coatings, and the like but are of insufficiently high molecular weight to serve efficiently as flocculants and filler retention aids in papermaking.

Acylated polyethylenimines of the same structure can be produced by conventional polymerization of N-acylethylenimine. However, the polymers made by this method usually have molecular weights considerably lower than those made from corresponding oxazolines.

SUMMARY OF THE INVENTION

It has now been found that high molecular weight resins having a unique combination of valuable properties are obtained by a limited crosslinking of a partially hydrolyzed linear acylated ethylenimine polymer to form a branched structure which retains the original water solubility but which has a greatly increased viscosity. These resins are obtained by a process which comprises removing by acidic hydrolysis about 20–50 percent of the N-acyl groups from a linear acylated ethylenimine polymer having a molecular structure as defined above and an average molecular weight of 5,000–200,000, and reacting the partially deacylated polymer with about 1–10 mole percent based on the ethylenimine units of a polyfunctional, preferably a difunctional electrophilic branching or crosslinking polyalkylenepolyamine chain extender such as an epihalohydrin or a diepoxide, thereby substituting and lightly crosslinking the linear polymer chains by reaction at the deacylated nitrogen sites in those chains. The term "ethylenimine units" is used to define all such units in the polymer whether acylated or not.

Polymers useful in the present invention are those wherein the group designated as R in the above polymer structure is an alkyl radical of 1–3 carbon atoms, i.e., methyl, ethyl, isopropyl, or propyl. Additionally, for convenient availability and the favorable range of molecular weight thereby provided, the acylated polymer is preferably derived from the acid-catalyzed polymerization of the corresponding oxazoline as previously set forth.

DETAILED DESCRIPTION

Most preferred as starting polymers for the purpose of the present invention are those having an average molecular weight of 20,000–100,000 obtained by polymerization of 2-lower alkyl-2-oxazolines such as 2-methyl-2-oxazoline, 2-ethyl-2-oxazoline and 2-isopropyl-2-oxazoline.

The hydrolysis step can be carried out under conventional conditions for the aqueous acid-catalyzed hydrolysis of a carboxylic acid ester. A temperature within the range 50–150° C. and a strong mineral acid or equivalent such as HCl, H₂SO₄, H₃PO₄, toluenesulfonic acid, and the like are illustrative conditions.

Suitable branching or crosslinking reagents are known polyfunctional electrophilic reagents capable of reacting with polyimine amino nitrogen atoms. These include epihalohydrins such as epichlorohydrin, epibromohydrin, and 4-chloro-1,2-epoxybutane; diepoxides such as butadiene diepoxide, 1,2,5,6-diepoxyhexane, and polyalkylene ether diepoxides; and various other reactants of this general class such as ethylene sulfate, divinylsulfone, carbon suboxide, m-tolylene diisocyanate, cyanuric chloride, polyvinyl isothiocyanate, acetylketene, 1,4-dichloro-2-butene, and 1,4-(2-butenylene)bis(dialkyl sulfonium halide).

The above polyfunctional electrophilic reagents are conventionally referred to as crosslinking agents and are so described herein. However, in the present process they function more as branching agents in that the lightly crosslinked polymer structures thereby produced are best described as branched, essentially two-dimensional molecules rather than the gelled, three-dimensional structures usually meant by the term cross-linked resin. The products of the present invention, therefore, remain water-soluble, but their water solutions have greatly increased viscosity as compared to the starting polymers.

The substituted polymer structure resulting from this reaction consists essentially of linear chains of partially hydrolyzed polymer composed of the units

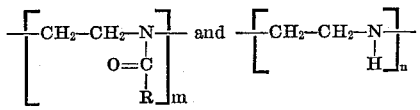

in random combination wherein those chains are substituted at secondary amine nitrogen atoms by residues of the branching or crosslinking reagent, only some of those atoms being so reacted as previously defined by the mole percent of crosslinking agent used. In the above unit formulas, $m$ and $n$ represent the total number of each unit in the polymer chain. Under the molecular weight range and percent deacylation specified above, $m$ and $n$ have the following relationships:

$m+n=44$ to 2350 (mol. wt.=5000–200,000)
$M=1n$ to $4n$ (20–50% deacylation)

An illustrative section of the partially crosslinked polymer structure would have a formula such as the following, wherein A represents the residue of the crosslinking reagent.

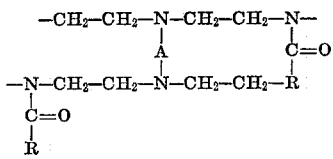

The crosslinking step is carried out under aqueous alkaline conditions conventional for this type of reaction. Suitably, the aqueous acid hydrolysis solution is made alkaline by addition of excess alkali metal hydroxide or carbonate and this solution is reacted at about ambient temperature with the crosslinking reagent. Because of the viscosity of the product solution, it is usually desirable to dilute the solution with water to a concentration of 5–20 percent by weight polymer before adding the crosslinking reagent.

The substituted or branched polymer products are valuable flocculants and drainage aids which can be used in flocculating and settling ore slurries, raw sewage, and similar suspensions. They are particularly useful in paper manufacture to promote filler retention and avoid yellowing of the finished paper. For this purpose they are preferably added to a cellulosic fiber slurry at the beater, head box, or other point which provides good mixing prior to formation of the paper sheet. The fiber slurry can be any conventional paper pulp including chemically or mechanically produced wood pulp, rag pulp, and similar cellulosic fibers.

Example 1

Dried 2-ethyl-2-oxazoline was mixed with 0.05 percent by weight of 47% BF$_3$ in ether and this mixture was heated at about 100° C. under a nitrogen blanket to cause polymerization. The polymer thereby produced had an average molecular weight of 30,000 by membrane osmometer measurments and it was essentially an N-propionylated polyethylenimine. A solution of 60 g. of this polymer in a mixture of 100 g. of water and 10 g. of conc. hydrochloric acid was heated at its reflux temperature for seven days to produce a modified polymer wherein about a third of the propionyl groups had been hydrolyzed from the polymer chain. The acid in the solution was neutralized by addition of aqueous NaOH to pH 11.5. The aqueous solution, diluted to a concentration of 15 percent by weight polymer, had a viscosity of 42 cps. at 23° C.

To 30 g. of the 15 percent solution there was added 0.097 g. (2.3 mole percent) of epichlorohydrin and the mixture was shaken 20 hours at room temperature, then put in an 80° C. oven for 2.5 hours. At this point the solution was extremely viscous, measuring greater than 100,000 cps. at 23° C. When diluted with water to one percent by weight concentration of polyoxazoline, the viscosity of the solution was 20 cps.

Examples 2–4

Following the procedure of Example 1, samples of polymerized 2-ethyl-2-oxazoline (PEO) of 26,000 and 30,000 molecular weight were hydrolyzed to remove about one third of the N-propionyl groups and neutralized 15% solutions of these hydrolyzed materials were reacted with different molar proportions of epichlorohydrin to obtain substituted or branched polymers providing aqueous solutions of various viscosities. The product of Example 1 is included for purpose of comparison.

| | | Viscosity, cps. at 23° C. | | |
|---|---|---|---|---|
| | Mole percent epichloro-hydrin | 15% solutions | | 1% solution after epichloro-hydrin |
| M.W. PEO [1] | | Before epichloro-hydrin | After epichloro-hydrin | |
| 26,000 | 1.7 | 35 | 100 | 3.8 |
| 26,000 | 2.1 | 35 | 355 | 4.3 |
| 30,000 [2] | 2.3 | 42 | >100,000 | 20 |
| 30,000 | 2.6 | 42 | >100,000 | 86.2 |

[1] Before hydrolysis.
[2] Product of Example 1.

Example 5

The molecular weight of polymerized oxazoline is dependent upon the quantity of acidic polymerization catalyst used. The following table shows the relationship between the weight percent of 47% solution of BF$_3$ in ether on the one hand and the viscosity and molecular weight of the polymerized 2-ethyl-2-oxazoline obtained on the other hand. Viscosities are of 20 weight percent solutions in water at 23° C.; average molecular weights were determined by membrane osmometer measurements.

| Percent BF$_3$ solution | Viscosity, cps. | Mol. wt. |
|---|---|---|
| 2.4 | 14 | |
| 0.21 | 20 | 6,300 |
| 0.17 | 42 | 11,100 |
| 0.067 | 181 | 20,000 |
| 0.048 | 290 | 41,000 |

Examples 6–9

The relationship between the extent of hydrolysis and the severity of hydrolysis conditions is shown by the following data obtained by hydrolyzing polymerized 2-ethyl-2-oxazoline with hydrochloric acid at reflux temperature. In Examples 6, 7 and 8, one gram of polymer having an average molecular weight of about 20,000 was heated in a refluxing solution of 50 ml. 1 N HCl in 75 ml. of water. In Example 9, ten grams of polymer having a molecular weight of 41,000 was heated in a refluxing solution of 5 g. conc. HCl in 94 g. of water.

| Example | Reflux time, days | Ml. 1 N NaOH* per g. polymer |
|---|---|---|
| 6 | 0.8 | 8 |
| 7 | 1.4 | 10.5 |
| 8 | 4 | 11 |
| 9 | 7 | 17 |

*Ml. base required to go from pH 2.7 to pH 6.0, a measure of the extent to which acyl groups were hydrolyzed from the polymer structure.

Example 10

High molecular weight polyethylenimine was partially acetylated and compared with both the non-acetylated polymer and the substituted hydrolyzed poly(2-ethyl-2-oxazoline) of Example 1 as a paper pulp additive.

Acetylation procedure.—A solution of 11.5 g. of polyethylenimine (mol. wt. 60,000, one percent aqueous solution viscosity at 23° C. was 3.6 cps.) in 113.5 g. of water was cooled to ice temperature and 35 g. of 50% NaOH was added. To this mixture was added dropwise acetic anhydride in different molar proportions while the reaction mixture was stirred and cooled by an ice bath. The resulting solution was contacted with mixed ion exchange resin beads (in the hydrogen and hydroxyl ion forms) until the solution reached a constant pH of 11.5, indicating that all of the soluble ionic material had been removed. The pure acylated polymer was then recovered as a hygroscopic, water-soluble solid by evaporating the purified solution and vacuum drying the residue. The following results were found, determining the extent of acetylation by nuclear magnetic resonance spectra analysis.

| Mole percent Ac$_2$O: | Acetylation (percent of theory) |
|---|---|
| 75 | 53 |
| 100 | 67 |

The above polymers were compared as paper additives by incorporating them in a 1% fiber slurry in a proportion of about one pound per ton of fiber and measuring the brightness values and the quantity of filler retained in the finished hand sheets. The pulp used was a 50:50 hardwood: softwood kraft paper pulp containing 10% kaolin clay and 2% TiO$_2$ as filler. Brightness measurements on the finished paper samples were made with a Bausch and Lomb Opacimeter while filler retention was determined by weight of the ash from burned samples.

| Resin additive | Percent acylation | Lbs./ton | Paper brightness | Percent filler retained |
|---|---|---|---|---|
| PEI | 0 | 1.2 | 86.6 | 73.5 |
| PEI | 53 | 1.2 | 87.3 | 38.5 |
| PEI | 67 | 1.2 | 87.4 | 26.2 |
| PEO* | 67 | 1.04 | 86.7 | 63.7 |

*Hydrolyzed and substituted poly(2-ethyl-2-oxazoline) of Example 1.

Example 11

The hydrolyzed and substituted product of Example 3 was tested as a flocculating agent to settle a taconite ore aqueous slurry and compared with a polyethylenimine of 50,000–100,000 molecular weight, viscosity of its aqueous 20% solution at 23° C., 770 cps. Both additives were employed in 2 parts per million concentration. The ore slurry, with or without polymer additive, was thoroughly stirred, then allowed to settle for 10 minutes and light transmittance measurements were made.

| Polymer additive: | Light transmittance percent after 10 minutes |
|---|---|
| None | <50 |
| Polyethylenimine | 80 |
| Product of Ex. 3 | 86.5 |

Example 12

The hydrolyzed and branched oxazoline polymers of this invention are also useful as flocculants to settle sewage suspensions. To illustrate this, 200 ml. samples of a raw sewage sludge containing 5% solids were diluted with 50 ml. of water, stirred, and filtered through a 14 cm. Buchner funnel under 20 inches of water vacuum. The polymer additive was employed in a concentration of 10 lbs. per ton of sludge.

| Polymer additive: | Filtration rate ml./10 seconds |
|---|---|
| None | <25 |
| Product of Ex. 3 | 77 |

Example 13

A sample of dried 2-methyl-2-oxazoline was polymerized with BF$_3$ etherate catalyst essentially as described in Example 1. The polymeric product thereby obtained was an N-acetylated polyethylenimine having an average molecular weight of 11,700 as determined by membrane osmometry. The viscosity of a 20 percent solution in water was 26 cps. at 23° C.

This polymer was partially hydrolyzed by adding 15 g. of conc. hydrochloric acid to a solution of 30 g. of the polymer in 100 g. of water and refluxing the solution for seven days. The solution had a strong odor of acetic acid after this treatment, indicating that hydrolysis had taken place. Titration of a sample of the partially hydrolyzed material with standard NaOH solution indicated about 50% of the theoretical acetyl groups had been hydrolyzed from the polymer molecules.

A 3.03 g. portion of the acidic hydrolyzed solution containing the equivalent of 3 g. of polymerized oxazoline was made alkaline (pH 11) by addition of 2 g. 50% NaOH, the solution then having a viscosity of 9 cps. at 23° C. To this solution was added 0.5 g. of D.E.R. 736, a polypropylene oxide with terminal glycidyl ether groups and having an epoxide equivalent weight of 175–205, and the solution was stirred for 16 hours at room temperature, then heated 3 hours at 90° C. to complete the branching reaction. This solution, labeled A, had a viscosity of 56 cps.

A second 30 g. portion of the hydrolyzed acidic solution was treated as above except that 0.7 g. of the same polyglycol diepoxide was added. The resulting solution (B) had a viscosity of 84,000 cps.

Example 14

Samples of the partially hydrolyzed polymer and the branched polymers A and B of Example 13 were tested for flocculating efficiency by adding portions to 50 ml. volumes of a 50% aqueous dispersion of clay in a graduated cylinder and measuring the time for 20% settling of the heavy clay demarcation line, i.e., from the 50 ml. to the 40 ml. mark.

| Polymer Sample | Lbs./ton of clay | Settling time, seconds | Overhead liquor |
|---|---|---|---|
| Partially hydrolyzed | 7 | 59 | Cloudy. |
| A | 1 | 28 | Clear. |
| B | 1 | 41 | Do. |

Other hydrolyzed and branched alkyloxazoline polymers of this invention as described above are similarly effective as fluocculants or settling agents in ore, sewage, and other such aqueous suspensions.

We claim:
1. A process for making a substituted polyimine resin which comprises removing by acidic hydrolysis about 20–50 percent of the N-acyl groups from a linear acylated ethylenimine polymer whose structure consists essentially of repeating units of the formula

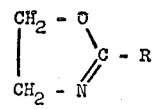

wherein R is an alkyl radical of 1–3 carbon atoms, said polymer having an average molecular weight of 5,000 to 200,000 and reacting the partially deacylated polymer with about 1–10 mole percent based on the ethylenimine unit of a difunctional polyimine crosslinking agent which is an epihalohydrin, a di-vicinal-epoxide, ethylene sulfate, divinyl sulfone, carbon suboxide, tolylene diisocyanate, acetylketene, 1,4-dichloro-2-butene, or 1,4-(2-butenylene) bis(dialkyl sulfonium halide).

2. The process of claim 1 wherein the acylated ethylenimine polymer is formed by the cationic catalyst initiated polymerization of an oxazoline having the formula

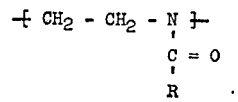

3. The process of claim 1 wherein the crosslinking agent is an epihalohydrin.

4. The process of claim 3 wherein the crosslinking agent is epichlorohydrin.

5. The process of claim 1 wherein the crosslinking agent is a polypropylene glycol diglycidyl ether.

6. The substituted polyimine product of the process of claim 1.

7. The product of claim 6 wherein the crosslinking agent is epichlorohydrin.

8. The product of claim 6 wherein the crosslinking agent is a polypropylene glycol diglycidyl ether.

9. The process of claim 1 wherein the crosslinking agent is an epihalohydrin or a di-vicinal-epoxide.

References Cited
UNITED STATES PATENTS

| | | | |
|---|---|---|---|
| 2,272,489 | 2/1942 | Ulrich | 260—239 |
| 2,296,225 | 9/1942 | Ulrich | 260—239 |
| 2,849,411 | 8/1958 | Lehmann et al. | 260—29.2 |
| 3,052,669 | 9/1962 | Gavin et al. | 260—239 |
| 3,373,194 | 3/1968 | Fuhrmann et al. | 260—559 |
| 3,313,736 | 4/1967 | Dickson et al. | 252—321 |

WILLIAM H. SHORT, Primary Examiner

E. A. NIELSON, Assistant Examiner

U.S. Cl. X.R.

162—164; 210—54; 260—2 EN, 2 EP, 47 EN, 65, 77.5 CH, 79, 79.5 NV, 91.7